(12) United States Patent
Falsetti et al.

(10) Patent No.: US 11,420,470 B2
(45) Date of Patent: Aug. 23, 2022

(54) WHEEL BEARING

(71) Applicant: Aktiebolaget SKF, Gothenburg (SE)

(72) Inventors: Fabio Falsetti, Turin (IT); Marc Schollmeyer, StAlbans (GB)

(73) Assignee: AKTIEGOLAGET SKF

( * ) Notice: Subject to any disclaimer, the term of this patent is extended or adjusted under 35 U.S.C. 154(b) by 0 days.

(21) Appl. No.: 16/937,665

(22) Filed: Jul. 24, 2020

(65) Prior Publication Data

US 2021/0033143 A1 Feb. 4, 2021

(30) Foreign Application Priority Data

Aug. 1, 2019 (IT) .................. 102019000013578

(51) Int. Cl.
*B60B 27/00* (2006.01)
*F16C 33/58* (2006.01)

(52) U.S. Cl.
CPC ...... *B60B 27/0094* (2013.01); *B60B 27/0005* (2013.01); *B60B 27/0042* (2013.01); *F16C 33/583* (2013.01); *B60B 2380/73* (2013.01); *F16C 2326/02* (2013.01)

(58) Field of Classification Search
CPC .... F16C 19/184; F16C 19/185; F16C 19/186; F16C 19/187; F16C 2326/02; F16C 33/583; B60B 27/0005; B60B 27/001; B60B 27/0036; B60B 27/0042; B60B 27/0094; B60B 2380/73
See application file for complete search history.

(56) References Cited

U.S. PATENT DOCUMENTS

| | | | |
|---|---|---|---|
| 4,417,643 A * | 11/1983 | Guimbretiere | ...... B60B 27/0005 180/254 |
| 4,473,129 A * | 9/1984 | Guimbretiere | ...... B60B 27/0005 180/254 |
| 4,764,153 A * | 8/1988 | Jacob | ...... B60B 35/18 464/111 |
| 10,369,840 B2 * | 8/2019 | Sguotti | ........ F16D 3/2245 |
| 2008/0093914 A1 * | 4/2008 | Mabuchi | ....... B60B 27/0042 301/105.1 |
| 2009/0046975 A1 | 2/2009 | Kawamura et al. | |
| 2009/0180726 A1 * | 7/2009 | Siebeneick | ........ B60B 27/0026 384/512 |
| 2013/0147258 A1 * | 6/2013 | Falsetti | ......... B60B 27/001 301/110 |
| 2013/0283954 A1 * | 10/2013 | Niebling | ........ B60B 27/0084 74/434 |

(Continued)

FOREIGN PATENT DOCUMENTS

| | | |
|---|---|---|
| EP | 0181654 | 5/1986 |
| JP | 2013035368 | 2/2013 |
| WO | 2019111903 | 6/2019 |

OTHER PUBLICATIONS

International Search Report for Corresponding Italian Patent Application No. 102019000013578 dated May 20, 2020.

*Primary Examiner* — Alan B Waits

(74) *Attorney, Agent, or Firm* — Reed Smith LLP

(57) ABSTRACT

A wheel bearing including at least one inner ring. In order to achieve a greater efficiency, the inner ring forms an outer ring of a tripod constant-velocity joint. The wheel bearing may further include an outer ring and two rolling-element rows including a first rolling-element row and a second rolling-element row.

16 Claims, 2 Drawing Sheets

(56) References Cited

U.S. PATENT DOCUMENTS

2016/0375725 A1* 12/2016 Bosco ................ F16C 35/073
                                                      301/6.1
2017/0284460 A1   10/2017 Sguotti

* cited by examiner

WHEEL BEARING

CROSS REFERENCE TO RELATED APPLICATION

This application is based on and claims priority under 35 U.S.C. § 119 to Italian Application No. 102019000013578, filed Aug. 1, 2019, the entire contents of which are incorporated herein by reference.

FIELD

The exemplary embodiments disclosed herein relate to a wheel bearing.

BACKGROUND

A wheel bearing may include an inner ring connected to a Rzeppa joint.

Furthermore, tripod constant-velocity joints are known; c.f., for example, the publication WO2019111903A1.

Furthermore, a device is known wherein a rim is attached to a vehicle by a single nut. In addition, the attaching of a rim with the aid of adapters that are connected to a wheel-bearing flange by bolts is known.

DETAILED DESCRIPTION

Figure 1:
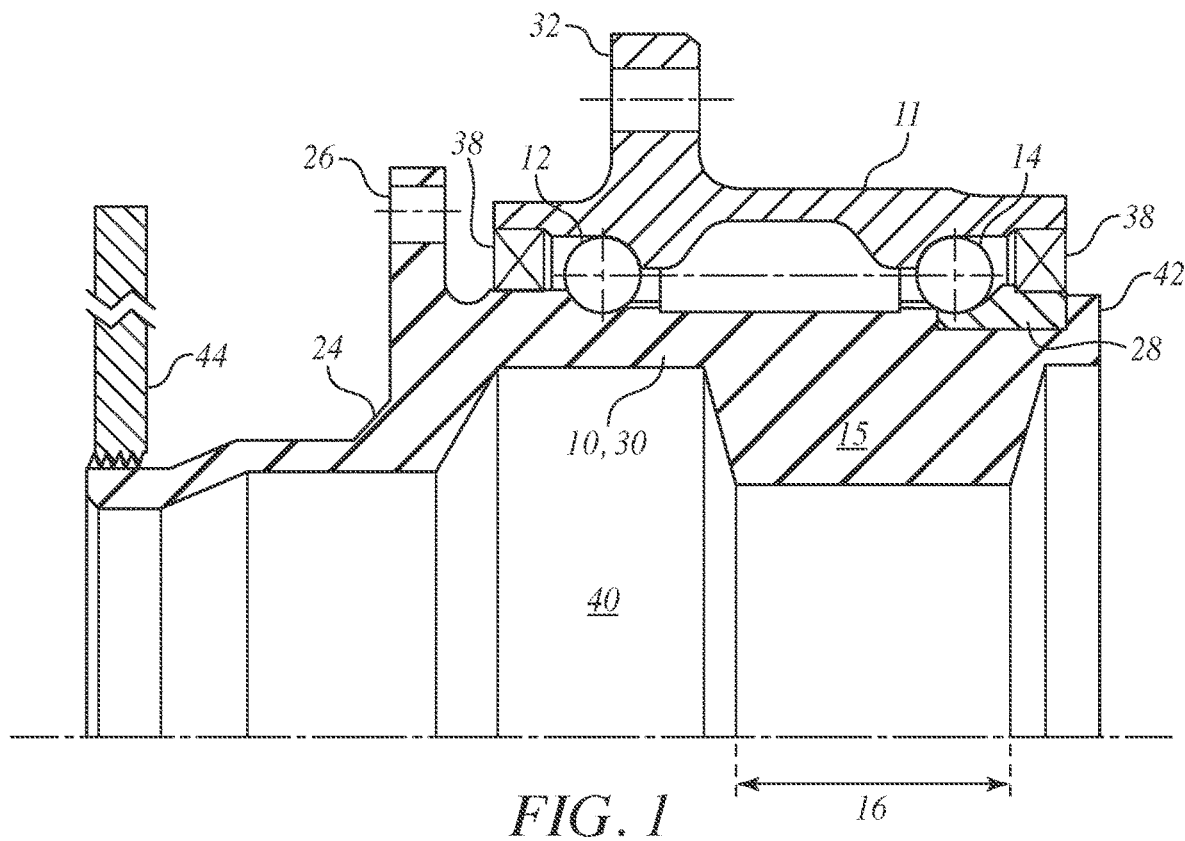
FIG. 1 shows an axial section through a wheel bearing according to exemplary embodiments.

Exemplary embodiments provide a wheel bearing including at least one inner ring. The inner ring forms an outer ring of a tripod constant-velocity joint. According to exemplary embodiments, an increased efficiency can be achieved. In particular, a simple transmission of high torques can be achieved. Furthermore, in particular, a compact design in the axial direction can be achieved. Furthermore, in particular, a simple manufacturability can be achieved. In addition, in particular a simple assembly can be achieved, since no adjusting of a preload is required. In particular, an optimizing of kinematics of a drive shaft that is provided for transmitting torque to the tripod constant-velocity joint can furthermore be achieved. In particular, the outer ring of the tripod constant-velocity joint is disposed relatively close axially to a side of the wheel bearing, which side is facing the wheel, to allow the use of a relatively long drive shaft for driving the inner ring, which results in fewer defects and an improved control of torque to be transmitted. Furthermore, in particular, the assembly is more stable in the finally assembled state.

The wheel bearing advantageously includes two rolling-element rows, and at least 30%, preferably at least 50%, of a maximum axial extension length of a raceway of the outer ring of the tripod constant-velocity joint is disposed axially between rolling-element rows of the wheel bearing. A particularly compact design can thereby be achieved.

Furthermore, exemplary embodiments provide that an axial center point of a raceway of the outer ring of the tripod constant-velocity joint is axially spaced from an axial center of the two rolling-element bearing rows less than 50%, preferably less than 35%, and particularly preferably less than 10% of a spacing between two rolling-element rows of the wheel bearing. Installation space can thereby be saved in the axial direction. In addition, a wheel bearing including at least one inner ring is proposed, wherein the inner ring forms an outer ring of a constant-velocity joint. According to exemplary embodiments, an increased efficiency can be achieved. In particular, a compact design can be achieved.

The inner ring is preferably configured as one-piece with at least one receiving region and/or locking flange for a rim. That the inner ring is configured "one-piece" should in particular be understood to mean that the inner ring is made of a casting and/or is only separable by destruction. In this way a very rigid design can be achieved. In particular, a further increase of the rigidity can be achieved in a wheel bearing having a relatively large diameter.

The inner ring is advantageously configured such that a rim including a single nut is attachable to the inner ring with respect to an axial direction of the inner ring. A low material fatigue during cornering can thereby be achieved.

The inner ring preferably includes a component that is attached in an interference-fit manner to an inner-ring base body of the inner ring. In this way the adjusting of a preload can be omitted. In particular, the component includes at least a part of a raceway.

The component is advantageously attached to the inner ring base body by orbital riveting. A stable construction can thereby be achieved.

Furthermore, a drive axle unit including the wheel bearing is provided whereby an increased efficiency and in particular a compact axial design can be achieved FIG. 1 shows an axial section through an inventive wheel bearing that includes an inner ring 10 and an outer ring 11. The wheel bearing is a double-row angular contact ball bearing including a first rolling-element row 12 and a second rolling-element row 14. The outer ring 11 is configured one-piece and comprises a flange 32, to which the outer ring is attachable vehicle-side, i.e., at a point, provided for this purpose, of a motor vehicle and in particular of a race car. At its axial end region the outer ring 11 is respectively sealed with respect to the inner ring 10 by a seal 38.

Figure 2:
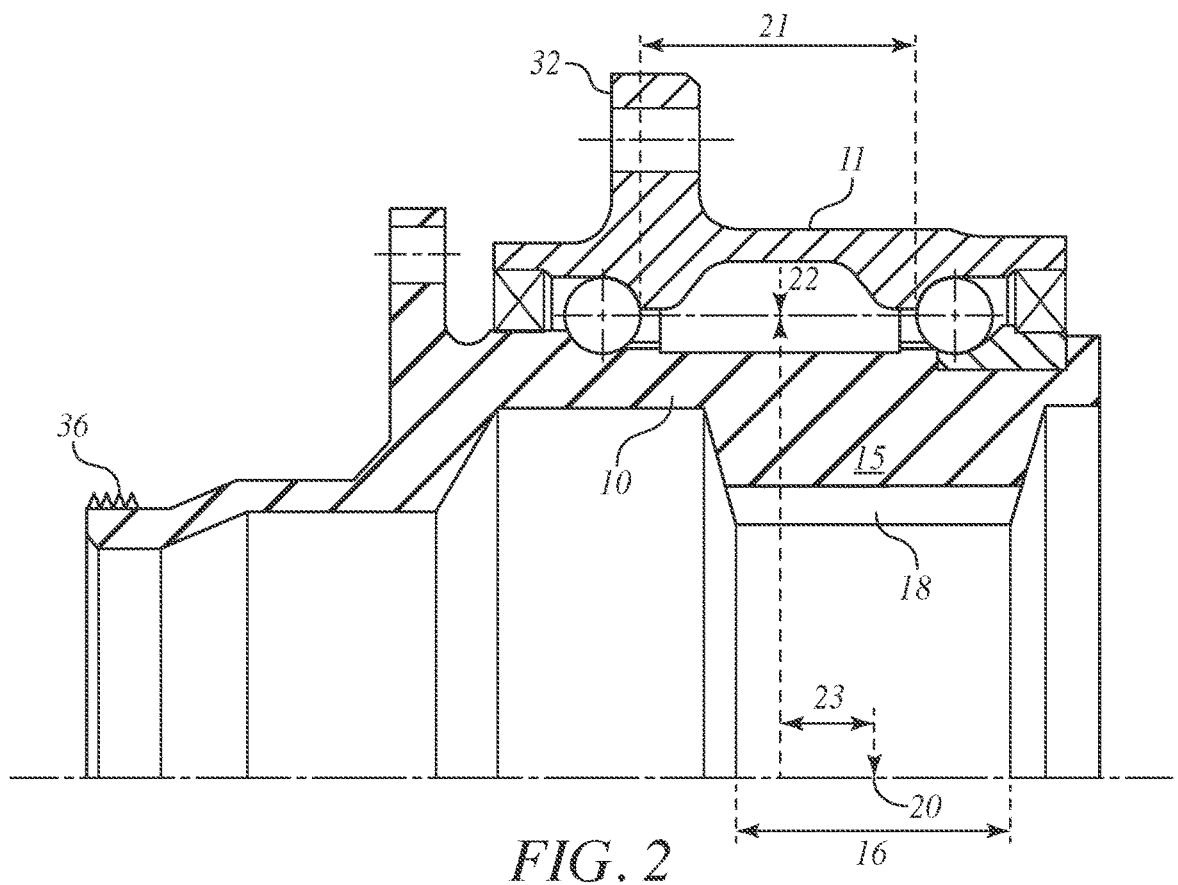
FIG. 2 shows a further axial section through the wheel bearing at a position that is spaced in the circumferential direction with respect to a position of the axial section in FIG. 1.
Figure 3:
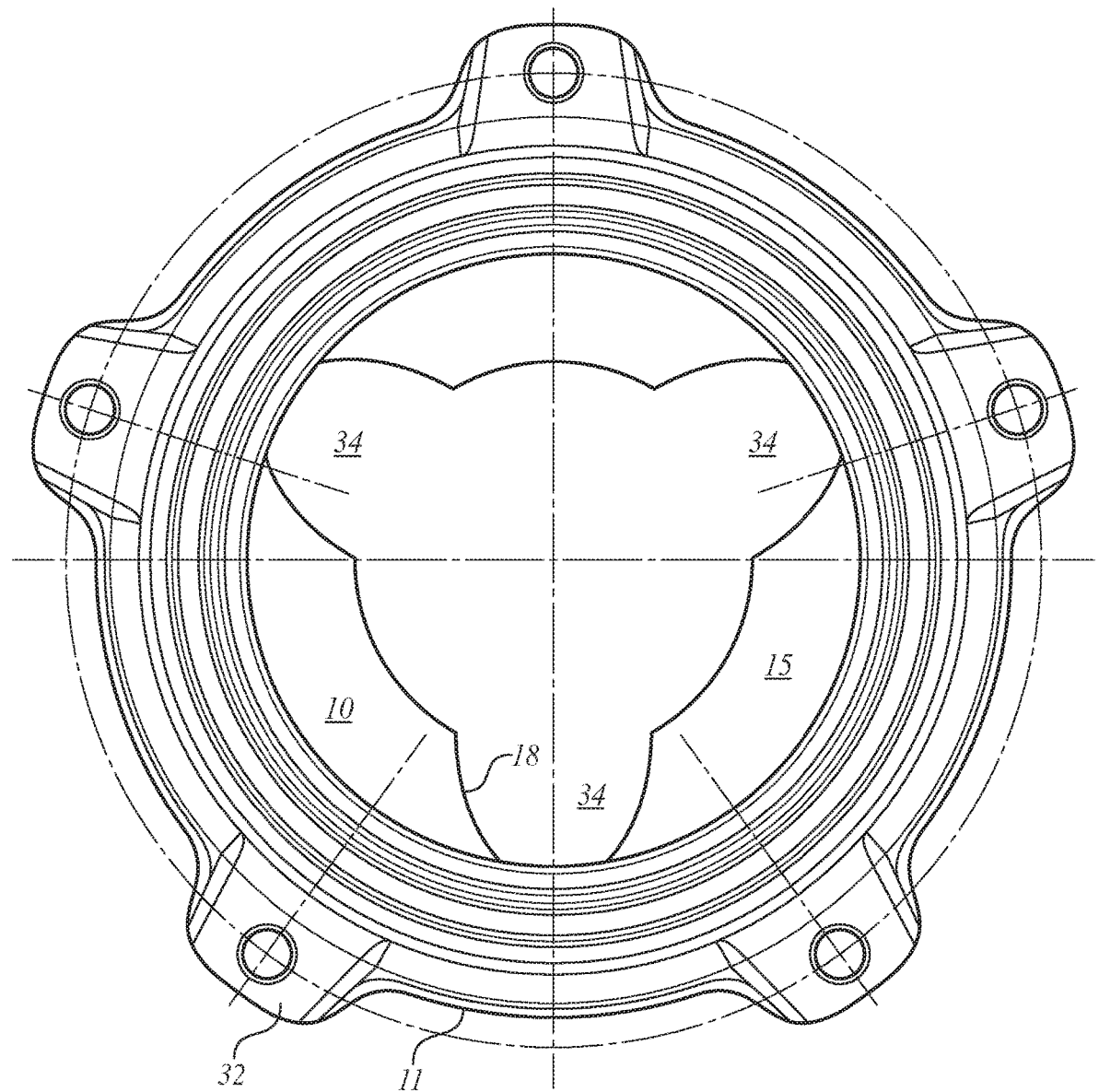
FIG. 3 shows a view on an end side of the wheel bearing in the axial direction.

The inner ring 10 also forms an outer ring 15 of a tripod constant-velocity joint (FIGS. 1-3). For this purpose the inner ring 10 includes three openings 34 emanating from an essentially hollow-cylindrical base shape, which three openings 34 extend in the axial direction and are geometrically identical. The openings 34 are bordered circumferentially by raceways of the tripod constant-velocity joint. These raceways are either configured geometrically identical to one another or inversely with respect to one another. More than 50% of a maximum axial extension length 16 of a raceway 18 of the raceways of the tripod constant-velocity joint is disposed axially between the rolling-element rows 12, 14. The description in the previous sentence also applies for the other raceways of the tripod constant-velocity joint. Furthermore, an axial center point 20 of the raceway 18 of the outer ring 15 is axially spaced from an axial center 22 of the two rolling-element rows 12, 14 by less than 30% of a spacing 21 between the two rolling-element rows 12, 14 of the wheel bearing. A part of the raceway 18 is disposed axially at the same height as one of the rolling-element rows.

The inner ring 10 is configured as one-piece with a rim locking flange 26 and a rim receiving region 24 for a rim. In a completely assembled state, the rim is attached to the locking flange 26 in the circumferential direction. In addition, with respect to an axial direction of the inner ring 10, the rim is attached to the inner ring 10 by a single nut 44. For this purpose the inner ring 10 includes an external thread 36 on one axial end, onto which the nut 44 is screwed-on after the attaching of the rim. To save weight, the inner ring 10 includes a region 40 that is disposed axially between the raceway 18 and the rim locking flange 26, and comprises an inner region that is disposed radially farther outward than the raceway 18. Furthermore, the rim receiving region 24 has a significantly smaller inner diameter than the region 40.

A raceway of the inner ring 10 for the rolling-element row 14 is formed by an inner ring component 28. The component 28 is attached in an interference-fit manner to a base body 30 of the inner ring 10, and specifically by orbital riveting. In a manufacturing of the wheel bearing, the component 28 is first applied to a region of the inner ring 10 that is then still cylindrical-surface-shaped, and subsequently an axially outwardly projecting region 42 of the inner ring 10 is deformed radially outward by orbital riveting so that the above-mentioned interference-fit attachment of the component 28 is achieved.

In a completely assembled state, during an operating process torque is transmitted to the inner ring by the tripod constant-velocity joint so that a wheel whose rim is attached to the inner ring is driven by the torque. Here the wheel bearing is part of a drive axle unit that is in turn a part of a motor vehicle, wherein the motor vehicle can in particular be a race car.

In one alternative exemplary embodiment, the inner ring 10 forms an outer ring of a constant-velocity joint.

In addition to the exemplary embodiments, as described above, it is to be understood that numerous further variants exist. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

REFERENCE NUMBER LIST

- 10 Inner ring
- 11 Outer ring
- 12 Rolling-element row
- 14 Rolling-element row
- 15 Outer ring
- 16 Extension length
- 18 Raceway
- 20 Center point
- 21 Spacing
- 22 Center
- 23 Spacing
- 24 Receiving region
- 26 Locking flange
- 28 Component
- 30 Inner-ring base body
- 32 Flange
- 34 Opening
- 36 External thread
- 38 Seal
- 40 Region
- 42 Axially outwardly projecting region

What is claimed:

1. A wheel bearing comprising:
   at least one inner ring,
   wherein the at least one inner ring is configured to form an outer ring of a tripod constant-velocity joint such that three axially extending openings emanate from a hollow-cylindrical base shape, wherein each axially extending opening is bordered circumferentially by one of the at least one raceway of the tripod constant-velocity joint, wherein the outer ring of the constant-velocity joint comprises at least one raceway,
   wherein the wheel bearing further comprises two rolling-element rows, and at least 30% of a maximum axial extension length of the at least one raceway of the outer ring of the constant-velocity joint is disposed axially between the rolling-element rows of the wheel bearing.

2. The wheel bearing according to claim 1, wherein an axial center point of the raceway of the outer ring of the constant-velocity joint is axially spaced from an axial center of the two rolling-element rows by less than 50% of a spacing between the two rolling-element rows of the wheel bearing.

3. The wheel bearing according claim 2, wherein the at least one inner ring and at least one of a rim receiving region and a rim locking flange are inseparably configured.

4. The wheel bearing according to claim 3, wherein with respect to an axial direction of the at least one inner ring, the at least one inner ring is configured to be attachable to a single nut.

5. The wheel bearing according claim 4, wherein the inner ring includes an inner ring component that is attached in an interference-fit manner to an inner-ring base body of the inner ring.

6. A drive axle unit including the wheel bearing of claim 5.

7. A motor vehicle including a drive axle unit according to claim 6.

8. The wheel bearing according to claim 1, wherein the at least one inner ring and at least one of a rim receiving region and a rim locking flange are inseparably configured.

9. The wheel bearing according to claim 8, wherein with respect to an axial direction of the at least one inner ring, the at least one inner ring is configured to be attachable to a single nut.

10. The wheel bearing according claim 1, wherein the inner ring includes an inner ring component that is attached in an interference-fit manner to an inner-ring base body of the at least one inner ring.

11. The wheel bearing according to claim 10, wherein the inner ring component is attached to the inner-ring base body by a radially deformed, axially outwardly projecting region.

12. The wheel bearing of claim 1, wherein at least 50% of a maximum axial extension length of the at least one raceway of the outer ring of the constant-velocity joint is disposed axially between the rolling-element rows of the wheel bearing.

13. The wheel bearing of claim 1, wherein an axial center point of the at least one raceway of the outer ring of the tripod constant-velocity joint is axially spaced from an axial center of the two rolling-element rows by less than 35% of a spacing between the two rolling-element rows of the wheel bearing.

14. The wheel bearing of claim 1, wherein an axial center point of the at least one raceway of the outer ring of the constant-velocity joint is axially spaced from an axial center of the two rolling-element rows by less than 10% of a spacing between the two rolling-element rows of the wheel bearing.

15. A wheel bearing comprising:
    at least one inner ring,
    wherein the at least one inner ring is configured to form an outer ring of a tripod constant-velocity joint such that three axially extending openings emanate from a hollow-cylindrical base shape, wherein each axially extending opening is bordered circumferentially by one of the at least one raceway of the tripod constant-velocity joint, wherein the wheel bearing further comprises two rolling-element rows; and wherein at least 30% of a maximum axial extension length of a raceway of the outer ring of the tripod constant-velocity joint is disposed axially between the rolling-element rows of the wheel bearing, wherein an axial center point of the raceway of the outer ring of the tripod constant-velocity joint is axially spaced from an axial center of the two rolling-element rows by less than 50% of a spacing between the two rolling-element rows of the wheel bearing, wherein the at least one inner ring and at least one of a rim receiving region and a rim locking flange are inseparably configured.

16. A wheel bearing comprising:
    at least one inner ring,
    wherein the at least one inner ring is configured to form an outer ring of a constant-velocity joint, wherein the outer ring of the constant-velocity joint comprises at least one raceway,
    wherein the wheel bearing further comprises two rolling-element rows, and at least 30% of a maximum axial extension length of the at least one raceway of the outer ring of the constant-velocity joint is disposed axially between the rolling-element rows of the wheel bearing;
    wherein the at least one inner ring and at least one of a rim receiving region and a rim locking flange are inseparably configured;
    wherein the inner ring further comprises an inner region disposed axially between the at least one raceway and the locking flange, wherein the inner region is disposed radially farther outward than the at least one raceway.

* * * * *